(12) United States Patent
Chen

(10) Patent No.: US 11,598,288 B2
(45) Date of Patent: Mar. 7, 2023

(54) MOTOR AND FUEL-POWERED HYBRID SYSTEM FOR A ROCKET THRUSTER

(71) Applicant: TAIWAN INNOVATIVE SPACE, INC., Miaoli County (TW)

(72) Inventor: Yen-Sen Chen, Miaoli County (TW)

(73) Assignee: Taiwan Innovative Space, Inc., Miaoli County (TW)

( * ) Notice: Subject to any disclaimer, the term of this patent is extended or adjusted under 35 U.S.C. 154(b) by 0 days.

(21) Appl. No.: 17/651,936

(22) Filed: Feb. 22, 2022

(65) Prior Publication Data

US 2022/0341374 A1  Oct. 27, 2022

Related U.S. Application Data

(63) Continuation-in-part of application No. 16/948,516, filed on Sep. 22, 2020, now abandoned.

(51) Int. Cl.
| | |
|---|---|
| *F02K 7/10* | (2006.01) |
| *F02K 9/95* | (2006.01) |
| *F02K 9/56* | (2006.01) |
| *F02K 9/52* | (2006.01) |
| *F02K 7/18* | (2006.01) |
| *F02K 7/14* | (2006.01) |

(52) U.S. Cl.
CPC ............... *F02K 7/10* (2013.01); *F02K 7/14* (2013.01); *F02K 7/18* (2013.01); *F02K 9/52* (2013.01); *F02K 9/56* (2013.01); *F02K 9/95* (2013.01)

(58) Field of Classification Search
CPC ..... F02K 7/10; F02K 7/14; F02K 7/18; F02K 7/20; F02K 9/78
See application file for complete search history.

(56) References Cited

U.S. PATENT DOCUMENTS

| 2,540,594 | A | * | 2/1951 | Price | F02K 1/15 |
| | | | | | 137/15.1 |
| 3,029,601 | A | * | 4/1962 | Arnberg | G01F 1/88 |
| | | | | | 60/243 |
| 2017/0284340 | A1 | * | 10/2017 | Peltz | H01T 13/54 |
| 2018/0119644 | A1 | * | 5/2018 | Gabaldo | F02K 7/14 |

FOREIGN PATENT DOCUMENTS

GB  2526611 B  *  9/2017  ............... F02K 5/02

* cited by examiner

*Primary Examiner* — Todd E Manahan
*Assistant Examiner* — Kyle Robert Thomas
(74) *Attorney, Agent, or Firm* — Wang Law Firm, Inc.

(57) ABSTRACT

A motor and fuel-powered hybrid system of a rocket thruster is disclosed, which mainly provides power through a motor and a fluid fuel injector. In particular, at the beginning stage of the rocket lift-off, the motor drives the compressor to provide power to send the rocket into air. When the speed and height of the rocket gradually increase, the fuel is ignited to give power to keep propelling the rocket, thereby reducing the fluid fuel that needs to be carried on the rocket, increasing the rocket's loading space and enhancing the carrying capacity.

8 Claims, 3 Drawing Sheets

MOTOR AND FUEL-POWERED HYBRID SYSTEM FOR A ROCKET THRUSTER

CROSS REFERENCE TO RELATED APPLICATION

This application is a continuation in part of U.S. patent application Ser. No. 16/948,516, which claims the earlier filing date of Sep. 22, 2020, the entire specification of which is incorporated herein by reference.

BACKGROUND

Field of the Invention

The present invention relates to a rocket, and more particularly to a motor and fuel-powered hybrid system for a rocket thruster.

Related Prior Art

At present, the most common rocket thrusters are mainly solid rocket thrusters, liquid rocket thrusters or hybrid rocket thrusters, and because hybrid rocket thrusters have the characteristics of being able to control thrust, relatively low cost, and have higher safety, the number of hybrid rocket thrusters is the largest compared to others.

It is worth mentioning that although hybrid rockets are easier to control their thrust than pure liquid or solid rockets, they still have many inconveniences in use. For example: the use of the mixing of fluid fuel and solid fuel as propulsion fuel from the beginning of lift-off results in the need to reserve a lot of fluid fuel for rocket lift-off on the rocket. Relatively, it is necessary to calculate the possible offset of the rocket after the fluid fuel is reduced, and then adjust the thrust of the rocket thruster according to the calculation results.

The most important thing to note is that since the fluid fuel required for the rocket to lift off from the ground to space must be prepared on the rocket body, in order to prepare enough fluid fuel for lift-off, a lot of space on the rocket body is used to store fluid fuel, resulting in a small amount of equipment that can be installed in the rocket, and thus the weight ratio of the objects that the rocket can carry is extremely low.

In view of this, it is indeed necessary to provide a technical means to solve the problem of extremely low weight ratio of objects that the rocket can carry.

SUMMARY

One objective of the present invention is to solve the problem of extremely low weight ratio of objects that the rocket can carry.

To achieve the above objective, a motor and fuel-powered hybrid system for a rocket thruster provided by the invention comprises:

a casing including a first tank, a second tank, and a third tank that are connected in sequence, the first tank including an air inlet and a first space communicating with each other, the second tank including a second space communicating with the first space, and the third tank including a third space communicating with the second space;

the motor disposed in the first tank, and including a central processing system, and a compressor that is power connected to the central processing system, wherein the central processing system includes a processing unit, a power supply, an electric motor and an altitude unit, the processing unit is controllingly connected to the power supply, the power supply is electrically connected to the electric motor, the electric motor is power connected to the compressor, and the processing unit is signally connected to the altitude unit, the altitude unit is used for obtaining an altitude information, the altitude unit is used for transmitting the altitude information to the processing unit, the processing unit pre-stores a first altitude, a second altitude and a the third altitude, and the processing unit is used for comparing the altitude information with the first altitude, the second altitude and the third altitude to obtain a stage information;

a fluid fuel injector disposed on the casing, controllingly connected to the processing unit, and including an injection head extending into the second tank, and the injection head being arranged toward the third tank to spray fluid fuel; and an igniter disposed in the third tank and controllingly connected to the processing unit, and being used for igniting fluid fuel;

by such arrangements, the processing unit controls an output power of the power supply and an output amount of the fluid fuel according to the stage information.

The present invention further provides an operation method of motor and fuel-powered hybrid system of a rocket thruster, which comprises:

a first driving step, detecting an altitude information, the altitude information matching a first altitude, a processing unit driving a power supply to provide power to drive an electric motor and a compressor to operate, the processing unit driving a fluid fuel injector to inject fluid fuel, and the processing unit driving the igniter to ignite the fluid fuel, so that the compressor and the fluid fuel provide kinetic energy at the same time;

a second driving step, detecting the altitude information, the altitude information matching a second altitude, the processing unit controlling the electric motor and the compressor to gradually reduce the load, the processing unit driving the fluid fuel injector to continuously inject fluid fuel, and an amount of fluid fuel injected by the fluid fuel injector is the same as an amount of fluid fuel injected in the first driving step, then the processing unit driving the igniter to ignite the fluid fuel; and a third driving step, detecting the altitude information, the altitude information matching a third altitude, the processing unit controlling the electric motor and the compressor again to gradually reduce the load until the electric motor and the compressor stop, the processing unit driving the fluid fuel injector to continuously inject fluid fuel, the amount of fluid fuel injected by the fluid fuel injector is the same as the amount of fluid fuel injected in the first driving step and the second driving step, and then the processing unit further driving the igniter to ignite the fluid fuel.

Since the rocket needs the greatest kinetic energy when it lifts off in the first stage, the main propulsion in the first stage comes from the compressor, and in the second stage, the rocket continues to maintain the speed at supersonic speed with the thrust provided by the compressor, the power generated by the compressor can greatly reduce the use of liquid fuel. Besides, the weight and volume of the compressor are much lower than that of the liquid fuel that can provide the same amount of power. Hence, the volume of fluid fuel that needs to be stored on the rocket is greatly reduced, so that the rocket can be loaded with more equipment, and the rocket's load ratio is greatly increased.

DETAILED DESCRIPTION

Figure 1:
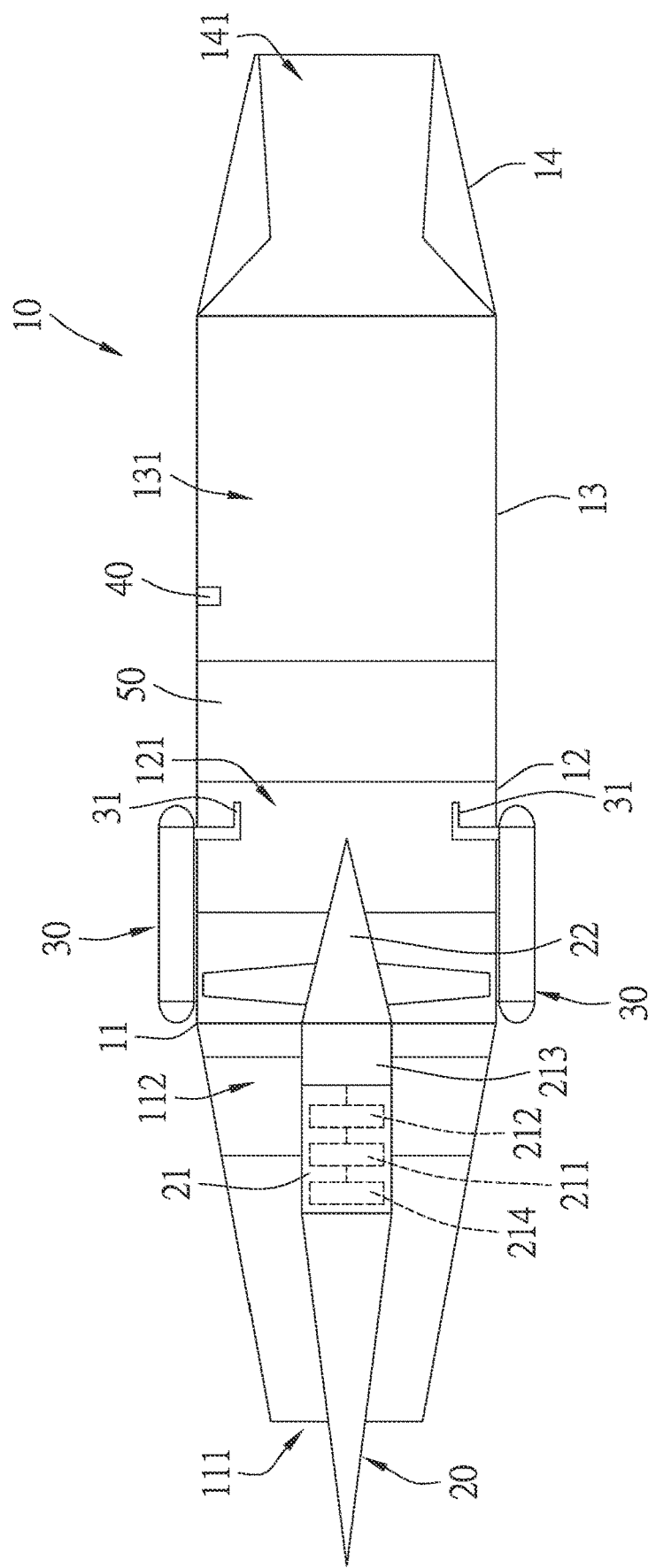
FIG. 1 is a schematic diagram of the structure of the present invention in a preferred embodiment.

Referring to FIG. 1, the present invention is a motor and fuel-powered hybrid system for rocket thruster, which essentially comprises: a casing 10, the motor 20, a fluid fuel injector 30 and an igniter 40.

The casing 10 includes a first tank 11, a second tank 12, and a third tank 13 that are connected in sequence. The first tank 11 includes an air inlet 111 and a first space 112 communicating with each other, the second tank 12 includes a second space 121 communicating with the first space 112, and the third tank 13 includes a third space 131 communicating with the second space 121. In this embodiment, the invention further includes a nozzle 14 connected to the third tank 13, and the nozzle 14 includes a passage 141 penetrating and communicating with the third space 131.

The motor 20 is disposed in the first tank 11, and includes a central processing system 21, and a compressor 22 that is power connected to the central processing system 21. In this embodiment, the central processing system 21 includes a processing unit 211 (Central Processing Unit/CPU), a power supply 212, and an electric motor 213. The processing unit 211 is controllingly connected to the power supply 212 to control the amount of power supplied from the power supply 212 to the electric motor 213. The power supply 212 is electrically connected to the electric motor 213, and can take the form of lithium ion batteries or hydrogen fuel cells to provide the electric motor 213 energy. The electric motor 213 is power connected to the compressor 22 to drive the compressor 22 to operate, and the compressor 22 can be an axial compressor 22, a centrifugal air compressor 22 or a combination of the two.

The fluid fuel injector 30 is disposed on the casing 10, controllingly connected to the processing unit 211 of the central processing system 21, and includes an injection head 31 extending into the second tank 12, and the injection head 31 is arranged toward the third tank 13, and the processing unit 211 is used to control the injection head 31 to spray fluid fuel toward the third tank 13. In this embodiment, the interior of the fluid fuel injector 30 is used for storage of hydrocarbon fuel. Hydrocarbon fuel is a bio-fluid fuel that can replace petrochemical diesel and is a substitute for petroleum energy. Hydrocarbon fuel is a fluid fuel that can be produced through a lipid exchange reaction using various lipid compounds (rapeseed oil, cottonseed oil . . . etc. various vegetable oils) and methanol as raw materials, under the action of a catalyst.

The igniter 40 is disposed in the third tank 13 and controllingly connected to the processing unit 211 of the central processing system 21, and the igniter 40 is used for igniting fluid fuel. In this embodiment, the igniter 40 is an autotransformer, and the processing unit 211 of the central processing system 21 controls the increase or decrease of its voltage, so that the igniter 40 can generate a spark at a specific time point and ignite the fluid fuel in the third tank 13.

The central processing system 21 further includes an altitude unit 214 which is signally connected to the processing unit 211. The altitude unit 214 is used to obtain the altitude of the rocket to create a altitude information, and then the altitude unit 214 sends the altitude information to the processing unit 211. The processing unit 211 pre-stores a first altitude, a second altitude and a third altitude, and compares the altitude information with the first altitude, the second altitude and the third altitude to obtain a stage information. The stage information includes a first stage, a second stage and a third stage. When the altitude information matches the first altitude, the first stage is entered. When the altitude information matches the second altitude, the second stage is entered, and when the altitude information matches the third altitude, the third stage is entered. In this embodiment, the first altitude may be 0 km from the ground, the second altitude may be 7-50 kilometers above the ground, the third altitude may be 50-80 kilometers above the ground, and the processing unit 211 controls the output power of the power supply 212 and the amount of the fluid fuel injected by the fluid fuel injector 30 according to the stage information.

In this way, in the first stage, the rocket is started from a static state, and in order to overcome the gravity and lift off smoothly, the rocket needs a large thrust, and the processing unit 211 drives the power supply 212 to provide electrical energy to drive the electric motor 213 and the compressor 22 to operate. In addition, the processing unit 211 drives the fluid fuel injector 30 to inject fluid fuel toward the third tank 13 and drives the igniter 40 to ignite the fluid fuel in the third tank 13. Therefore, in this stage, the compressor 22 and the fluid fuel are used to provide kinetic energy at the same time, so that the specific impulse (Specific Impulse Isp) reaches more than 2000. When the rocket enters the second stage after lifting to a certain altitude, in this embodiment, the second stage is entered when the altitude of the rocket reaches the stratosphere. In the second stage, the processing unit 211 controls the compressor 22 to gradually reduce the load, and the amount of fluid fuel that the fluid fuel injector 30 outputs is the same as that of the first stage, so that the kinetic energy provided by the fluid fuel is kept consistent with the first stage, and in this stage, the specific impulse (Specific Impulse Isp) is reduced to 1800. In the third stage, the processing unit 211 again control the compressor 22 to gradually reduce the load until the electric motor 213 and the compressor 22 stop, the processing unit 211 only maintains the amount of fluid fuel outputted by the fluid fuel injector 30, so that the kinetic energy provided by the fluid fuel is the same as that of the first stage and the second stage, and in this stage, the specific impulse (Specific Impulse Isp) is reduced to below 1500, whereby, in the first, second and third stages, the amounts of the fluid fuel that the processing unit 211 drives the fluid fuel injector 30 to inject are the same, but the kinetic energy provided by the compressor 22 is gradually reduced.

Among them, there is a mixing enhancer 50 disposed in the second tank 12, and the mixing enhancer 50 is located between the injection head 31 and the third space 131 of the third tank 13. When the injection head 31 injects fluid fuel toward the third tank 13, the fluid fuel will first pass through the mixing enhancer 50 and then enter the third space 131 of the third tank 13.

Figure 2:
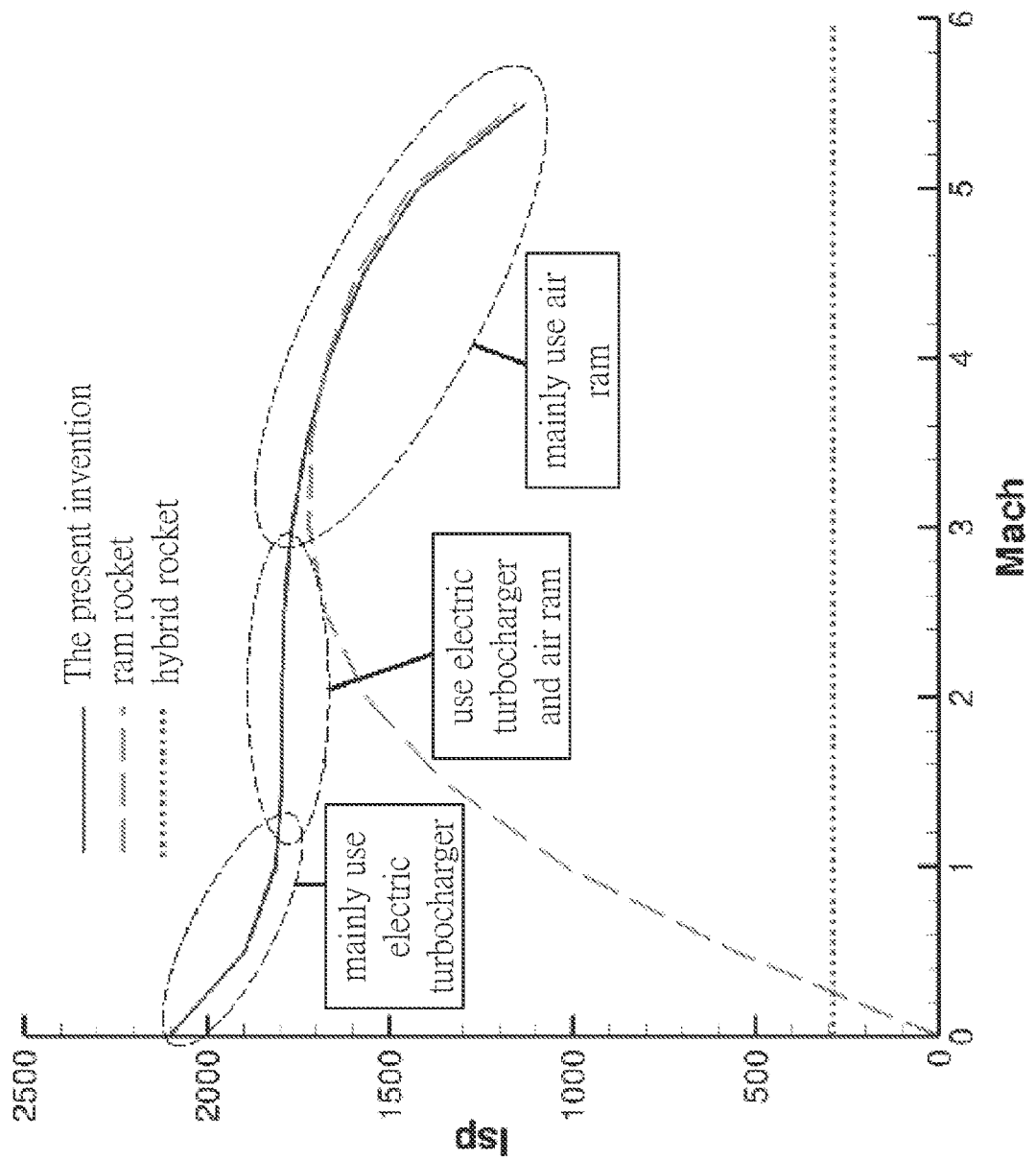
FIG. 2 is a graph of the injection conditions of the motor and the fluid fuel injector of the present invention in comparison with conventional hybrid rockets.

The above is the structural configuration and connection relationship of the present invention in a preferred embodiment. The use of the present invention and the effects it can produce are as follows:

Referring to FIGS. 1 and 2, the motor and the fuel power mixing system of a rocket thruster of the present invention mainly has three stages in use. In the first stage, the central processing system 21 first controls the compressor 22 to start, so that air enters the first space 112 from the air inlet 111 and passes through the compressor 22. When the air passes through the compressor 22, it becomes high pressure and sequentially passes through the second space 121, the third space 131 and the passage 141 to provide most of the driving force. Besides, the processing unit 211 controls the fluid fuel injector 30 to inject hydrocarbon fuel and controls the igniter 40 to ignite the hydrocarbon fuel to provide additional propulsion, thereby propelling the rocket into the air through the compressor 22 and the combustion of the hydrocarbon fuel.

After the rocket is propelled into the air through the compressor 22 and the combustion of the hydrocarbon fuel, and enters the second stage, the processing unit 211 controls the compressor 22 to reduce load, and the processing unit 211 further controls the fluid fuel injector 30 to continuously inject the same amount of hydrocarbon fuel, and in the second stage, the kinetic energy generated by igniting the hydrocarbon fuel and the kinetic energy generated by the compressor 22 continue to propel the rocket.

In the third stage, since the power of the power supply 212 is gradually exhausted, the processing unit 211 controls the compressor 22 to reduce load until it is turned off, and continues to control the fluid fuel injector 30 to continuously inject the same amount of hydrocarbon fuel toward the third tank 13. In the third stage, the propulsion mainly comes from the kinetic energy generated by igniting the hydrocarbon fuel. Please refer to FIG. 2, it can be seen that the curve of the third stage of the present invention, that is, the main use of the air ram stage, overlaps with the curve of the conventional rocket that only uses air ram power, which shows that the present invention mainly uses hydrocarbon fuel to provide kinetic energy in the third stage.

Since the rocket needs the greatest kinetic energy when it lifts off in the first stage, the main propulsion in the first stage comes from the compressor 22, and in the second stage, the rocket continues to maintain the speed at supersonic speed with the thrust provided by the compressor 22, the power generated by the compressor 22 can greatly reduce the use of liquid fuel. Besides, the weight and volume of the compressor 22 are much lower than that of the liquid fuel that can provide the same amount of power. Hence, the volume of fluid fuel that needs to be stored on the rocket is greatly reduced, so that the rocket can be loaded with more equipment, and the rocket's load ratio is greatly increased.

In addition, the present invention mainly obtains the stage information through the cooperation of the processing unit 211 and the altitude unit 214, and adjusts the ratio of the kinetic energy provided by the compressor 22 and the fluid fuel at any time according to the stage information, so that the rocket can adjust the way of outputting energy according to altitude.

Figure 3:
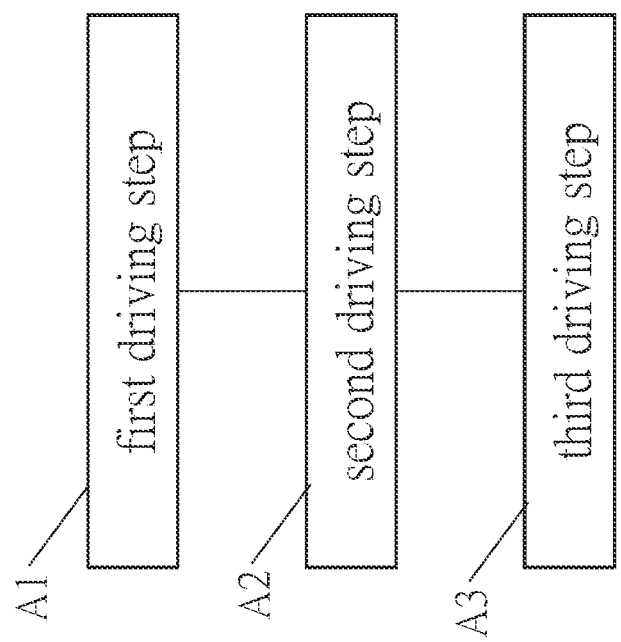
FIG. 3 is a flow chart showing the operation method of motor and fuel-powered hybrid system of a rocket thruster.

The present invention further provides an operation method of motor and fuel-powered hybrid system of a rocket thruster, please refer to FIG. 3, including:

A first driving step A1, detecting an altitude information, when the altitude information matches a first altitude, a processing unit 211 drives a power supply 212 to provide power to drive an electric motor 213 and a compressor 22 to operate, the processing unit 211 drives a fluid fuel injector 30 to inject fluid fuel, and the processing unit 211 drives the igniter 40 to ignite the fluid fuel, so that the compressor 22 and the fluid fuel provide kinetic energy at the same time. In this stage, the specific impulse (Specific Impulse Isp) reaches 2000 or more;

A second driving step A2, detecting the altitude information, when the altitude information matches a second altitude, the processing unit 211 controls the electric motor 213 and the compressor 22 to gradually reduce the load, and the processing unit 211 drives the fluid fuel injector 30 to continuously inject fluid fuel, and the amount of fluid fuel injected by the fluid fuel injector 30 is the same as the amount of fluid fuel injected in the first driving step, then the processing unit 211 drives the igniter 40 to ignite the fluid fuel, so that the total amount of kinetic energy provided by the compressor 22 and the fluid fuel gradually decreases, and the specific impulse (Specific Impulse Isp) in this stage decreases to 1800;

A third driving step A3, detecting the altitude information, when the altitude information matches a third altitude, the processing unit 211 controls the electric motor 213 and the compressor 22 again to gradually reduce the load, and the processing unit 211 drives the fluid fuel injector 30 to continuously inject fluid fuel, the amount of fluid fuel injected by the fluid fuel injector 30 is the same as the amount of fluid fuel injected in the first driving step and the second driving step, and the processing unit 211 further drives the igniter 40 to ignite the fluid fuel, so that the total amount of kinetic energy provided by the compressor 22 and the fluid fuel to gradually decrease again, and in this stage, the specific impulse (Specific Impulse Isp) decreases to below 1500.

What is claimed is:

1. A motor and fuel-powered hybrid system for a rocket thruster, comprising:
   a casing including a first tank, a second tank, and a third tank that are connected in sequence, the first tank including an air inlet and a first space communicating with each other, the second tank including a second space communicating with the first space, and the third tank including a third space communicating with the second space;
   the motor disposed in the first tank, and including a central processing system, and a compressor that is power connected to the central processing system, wherein the central processing system includes a processing unit, a power supply, an electric motor and an altitude unit, the processing unit is controllingly connected to the power supply, the power supply is electrically connected to the electric motor, the electric motor is power connected to the compressor, and the processing unit is signally connected to the altitude unit, the altitude unit is used for obtaining an altitude information, the altitude unit is used for transmitting the altitude information to the processing unit, the processing unit pre-stores a first altitude, a second altitude and a the third altitude, and the processing unit is used for comparing the altitude information with the first altitude, the second altitude and the third altitude to obtain a stage information;
   a fluid fuel injector disposed on the casing, controllingly connected to the processing unit, and including an injection head extending into the second tank, and the injection head being arranged toward the third tank to spray fluid fuel; and
   an igniter disposed in the third tank and controllingly connected to the processing unit, and being used for igniting fluid fuel;
   by such arrangements, the processing unit controls an output power of the power supply and an output amount of the fluid fuel according to the stage information, the output power of the power supply is sequentially reduced to zero according to the stage information, and the output amount of the fluid fuel is maintained at the same amount at the first altitude, the second altitude and the third altitude.

2. The motor and fuel-powered hybrid system for the rocket thruster as claimed in claim 1 further comprising a nozzle connected to the third tank, and the nozzle includes a passage penetrating and communicating with the third space.

3. The motor and fuel-powered hybrid system for the rocket thruster as claimed in claim 1, wherein the power supply takes the form of lithium ion batteries or hydrogen fuel cells.

4. The motor and fuel-powered hybrid system for the rocket thruster as claimed in claim 1, wherein the compressor is selected from a group consisting of an axial compressor, a centrifugal air compressor, and a combination of the axial compressor and the centrifugal air compressor.

5. The motor and fuel-powered hybrid system for the rocket thruster as claimed in claim 1, wherein an interior of the fluid fuel injector is used for storage of hydrocarbon fuel.

6. The motor and the fuel power mixing system of the rocket thruster as claimed in claim 1, wherein the igniter is an autotransformer.

7. The motor and fuel-powered hybrid system for the rocket thruster as claimed in claim 1 further comprising a mixing enhancer disposed in the second tank, and located between the injection head and the third space of the third tank.

8. An operation method of motor and fuel-powered hybrid system of a rocket thruster, comprising:

a first driving step, detecting an altitude information, the altitude information matching a first altitude, a processing unit driving a power supply to provide power to drive an electric motor and a compressor that compresses air for use in combustion to operate, the processing unit driving a fluid fuel injector to inject fluid fuel, and the processing unit driving the igniter to ignite the fluid fuel, so that the compressor and the fluid fuel provide kinetic energy at the same time;

a second driving step, detecting the altitude information, the altitude information matching a second altitude, the processing unit controlling the electric motor and the compressor to gradually reduce the load, the processing unit driving the fluid fuel injector to continuously inject fluid fuel, and an amount of fluid fuel injected by the fluid fuel injector is the same as an amount of fluid fuel injected in the first driving step, then the processing unit driving the igniter to ignite the fluid fuel; and a third driving step, detecting the altitude information, the altitude information matching a third altitude, the processing unit controlling the electric motor and the compressor again to gradually reduce the load until the electric motor and the compressor stop, the processing unit driving the fluid fuel injector to continuously inject fluid fuel, the amount of fluid fuel injected by the fluid fuel injector is the same as the amount of fluid fuel injected in the first driving step and the second driving step, and then the processing unit further driving the igniter to ignite the fluid fuel.

* * * * *